United States Patent
Dinwoodie (10) Patent No.: US 6,415,269 B1
(45) Date of Patent: Jul. 2, 2002

(54) INTERACTIVE REMOTE AUCTION BIDDING SYSTEM

(75) Inventor: David Lionel Dinwoodie, Flower Mound, TX (US)

(73) Assignee: BidCatcher, L.P., Flower Mound, TX (US)

( * ) Notice: Subject to any disclaimer, the term of this patent is extended or adjusted under 35 U.S.C. 154(b) by 0 days.

(21) Appl. No.: 09/086,877

(22) Filed: May 29, 1998

(51) Int. Cl.[7] .............................................. G06F 17/60
(52) U.S. Cl. ............................. 705/37; 705/1; 705/26; 705/19; 705/35; 705/36; 705/38; 379/338; 379/88.02; 379/88.24; 379/93.26; 379/283; 379/361; 379/457; 379/900
(58) Field of Search ............................... 705/37, 38, 35, 705/36, 1, 26, 19; 379/338, 88.02, 88.24, 93.26, 283, 361, 457, 900

(56) References Cited

U.S. PATENT DOCUMENTS

| | | | |
|---|---|---|---|
| 4,789,928 A | 12/1988 | Fujisaki | 364/401 |
| 5,191,410 A | 3/1993 | McCalley et al. | 358/86 |
| 5,247,347 A | 9/1993 | Litteral et al. | 358/85 |
| 5,440,623 A | 8/1995 | Moore et al. | 379/67 |
| 5,508,731 A | 4/1996 | Kohorn | 348/1 |
| 5,537,143 A | 7/1996 | Steingold et al. | 348/13 |
| 5,563,937 A | 10/1996 | Bruno et al. | 379/201 |
| 5,740,240 A | 4/1998 | Jolissaint | 379/265 |
| 5,774,873 A | * 6/1998 | Berent et al. | 705/26 |
| 5,794,219 A | * 8/1998 | Brown | 705/37 |
| 5,815,551 A | 9/1998 | Katz | 379/88.19 |
| 5,818,914 A | * 10/1998 | Fujisaki | 379/93.12 |
| 5,835,896 A | * 11/1998 | Fisher et al. | 705/37 |
| 5,890,138 A | 3/1999 | Godin et al. | 705/26 |
| 5,905,975 A | * 5/1999 | Ausubel | 705/37 |

FOREIGN PATENT DOCUMENTS

| | | | |
|---|---|---|---|
| WO | WO 9215174 | * | 9/1992 |
| WO | WO 9737315 | * | 10/1997 |

OTHER PUBLICATIONS

Gorda, B. and Wilson, Gregory, "Building and Running Online Auctions", Dr. Dobb's Journal, Oct. 1997, vol. 22, No. 10, pp. 84, 86–88, 91.*

* cited by examiner

Primary Examiner—Kyle J. Choi
Assistant Examiner—Akiba Robinson-Boyce
(74) Attorney, Agent, or Firm—Locke Liddell & Sapp LLP (57) ABSTRACT

An interactive remote auction bidding system for conducting an auction among participants located at remote locations from the auction site utilizes a data input device for communication over a network to the auction site. The system includes a data processor located at the auction site for generating bid information for communication over the network to the remote locations. A processor located at the auction side monitors the participants' data input devices for sensing participant bids generated by the participants' data input devices. The system further displays visual bid information at the auction site for transmission over the network to the participants and generates audible bid information in support of that visual bid information.

53 Claims, 4 Drawing Sheets

INTERACTIVE REMOTE AUCTION BIDDING SYSTEM

TECHNICAL FIELD OF THE INVENTION

The present invention relates to an interactive communications system, and more particularly, to an interactive remote auction bidding system allowing a plurality of bidders to participate in an auction on a real-time basis from multiple remote locations.

BACKGROUND OF THE INVENTION

Remarketing surplus products is a challenge for manufacturers and dealers in many industries, and in particular the equipment industry. Stale new inventory and "slightly used" product competes for customers with goods direct from the assembly lines. Equipment ownership and usage patterns have changed and continue to change. Whereas most new product was once sold to end users, now many industry segments deliver more than 65% of new product to "Rental/Lease Fleets". Equipment sold is often guaranteed for it's future value. Customers have transferred many elements of ownership risk to manufacturers and dealers by forcing sellers to provide rentals, leases, or future value guarantees. Consumer preference to rent is driven by a composite of factors including tighter lending standards, lack of tax incentives, increasing complexity and specialization of equipment, volatility of equipment values within their industries and increasing availability and competitiveness of short term equipment rental solutions. Rentals, long term leases and "buy back" agreements provide customers use of equipment without the ownership obligations or liabilities. Manufacturers and Dealers remain "at risk" and responsible for rental, lease and "buy back" equipment until it's ultimate sale. In view of these marketing techniques, as well as improvements in the useful life of a product, the burden or remarketing more of these products after their first substantial use remains with manufacturers, dealers and other rental operators. In many cases, the most severe competition for new sales is generated by identical "used product" rather than by new product of competitive manufacturers.

Manufacturers and dealers have achieved success generating sales of new products, but typically have less success remarketing used equipment and transferring ownership obligations to end users. "After market" remarketing specialists such as brokers, traders, import-export entrepreneurs and retail auctioneers provide needed expertise for second and subsequent sales of equipment. These remarketing specialists sell in direct competition to new products sold by dealers and manufacturers.

Due to the diverse demographics of their markets, and fractured communication among dealers, dealers' effectiveness is limited to small geographic areas in proximity to their dealership. Dealers have limited knowledge or success trading outside local trading areas. Manufacturers encourage "local" market focus. Whereas "local" focus for new equipment may be effective, remarketing surplus equipment locally limits potential and is largely an ineffective and costly strategy. At the same time, effort expended, travel costs, language, currency, cultural and information barriers plus lack of critical mass in any single market make venturing beyond local trade areas expensive, risky, inefficient, and often counterproductive for dealers. Accordingly, remarketing used equipment has been inefficient.

Conventionally, auctions of used equipment or the like require that the equipment be brought to the auction site and presented by the seller where the auction takes place. Additionally, all participants to the auction must assemble at the auction site. Such an auction therefore is typically limited to regional geographic areas due to the costs of assembling equipment as well as participants. Scale is crucial to auction success. Scale attracts buyers. The more buyers the better the result. The more specialized the product, the greater the distance both buyer and product must travel for the auction to achieve scale or critical mass. Freight on large equipment is expensive, and moving equipment to an auction site, and then removing the same equipment, if not sold, produces an inefficient non-value added expense. These expenses are further incurred by buyers traveling to auctions.

A need has thus arisen for a "real-time" auction information processing system which enables individuals dispersed over a wide geographic area to participate in an auction without gathering at the auction site. A need has further arisen for a system to allow individuals to participate in an auction without requiring a large investment in a technical infrastructure at the buyers'/bidders' remote locations.

SUMMARY OF THE INVENTION

In accordance with the present invention, an interactive remote auction bidding system for conducting an auction among participants located at remote locations from the auction site is provided. Each of the participants at a remote location utilizes a data input device for communication over a network to the auction site. The system includes a data processor located at the auction site for generating bid information for communication over the network to the remote locations. A processor located at the auction site monitors the participants' data input devices for sensing participant bids generated by the participants' data input devices. The system further displays bid information at the auction site for transmission over the network to the participants.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
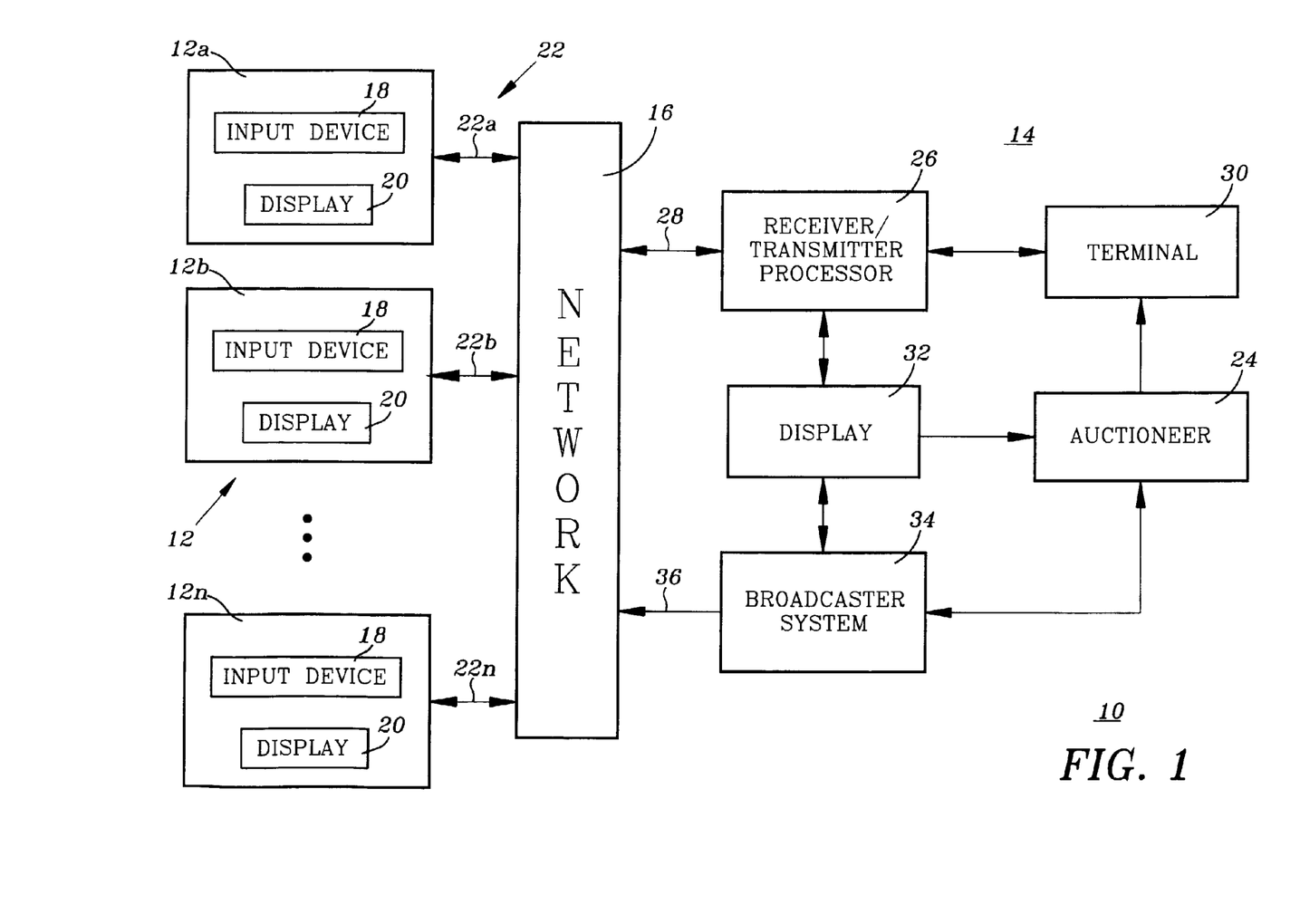
FIG. 1 is a block diagram of the present system.

Referring to FIG. 1, an interactive remote auction bidding system for conducting an auction among participants located at remote locations is illustrated, and is generally identified by the numeral 10. System 10 allows participants located at remote locations 12, 12a, 12b–12n to communicate with an auction site 14 via a communications network 16. Located at each remote site 12 is a data input device 18. Data input device 18 may comprise, for example, a conventional Touch Tone® telephone having a key pad which generates dual-tone multi-frequency signals (DTMF). Additionally, data input device 18 may include a cellular telephone, two-way pager, other radio wave transmitter/transponder, or personal computer, for generating bid acceptance data for communication over the network 16 to auction site 14. Each remote location 12 further includes a display device 20. Display device 20 receives information from auction site 14 via network 16, and may include, for example, a conventional television, video telephone conferencing display, or a personal computer display. Communication between remote sites 12 and network 16 takes place over communications links 22, 22a, 22b–22n.

Communications network 16 may include, for example, and is not limited to, a conventional telephone network, cellular network, satellite communications system, cable broadcast system, and television broadcast system. Network 16 may comprise a combination of various types of communications systems for communicating data between remote locations 12 and auction site 14. The configuration of network 16 depends upon the type of equipment used by participants at remote locations 12, and in its simplest form will include a telephone switching network and broadcast television system, and in its most state of the art form, the configuration will include the Internet.

Auction site 14 comprises a location remote from the participants at which bids are accepted and the auction is controlled. The auction is controlled by an auctioneer 24 located at auction site 14. Auctioneer 24 functions in a capacity similar to the capacity of an auctioneer in a typical auction where participants are located at the auction site. Equipment to be auctioned at auction site 14 may or may not be physically present at auction site 14. Located at auction site 14 is a receiver/transmitter processor 26 which receives and transmits bid information via network 16 to and from remote locations 12. Receiver/transmitter processor 26 may include, for example, a dual-tone multi-frequency receiver/processor for monitoring DTMF signals generated by input devices 18 at each remote site 12. Additionally, processor 26 may include voice recognition technology for receiving and decoding voice input from input device 18. Processor 28 is capable of identifying and monitoring each input device 18 from a remote site 12 as well as communicating via network 16 with each remote site 12.

Additionally, processor 26 receives initialization parameters, to be subsequently described, for the auction via a terminal 30. Initialization parameters are selected by auctioneer 24 and input to processor 26 via terminal 30. Processor 26 controls a display 32 located at auction site 14. Display 32 displays information such as, for example, the asking bid, current bid, bidder identification, location of bidder, and lot number. Where the auction is conducted across national boundaries, the asking bid and actual bid may be displayed in numerous foreign currency denominations. The information generated by processor 26 and displayed on display 32 is communicated to participants at remote locations 12 via a broadcaster system 34. Broadcaster 34 may include a conventional broadcaster television system whose output is supplied via communications link 36 to network 16. Broadcaster 34 may include a conventional television system, in addition to a satellite communications system, cable network, or the like. Information generated by broadcaster system 34 is displayed on displays 20 at each remote location 12. Broadcaster system 34 may capture a live "picture" of the auctioneer 24 at auction site 14 conducting the auction including pictures and other details of the equipment being auctioned. In this manner, each participant at remote location 12 has the sense of physically being present at auction site 14 during the auction. Broadcaster system 34 further captures information displayed on display 32 for transmission to each remote location 12. In this manner, during the bidding process real-time information is available to each bidder at remote site 12 during the auction.

Figure 2:
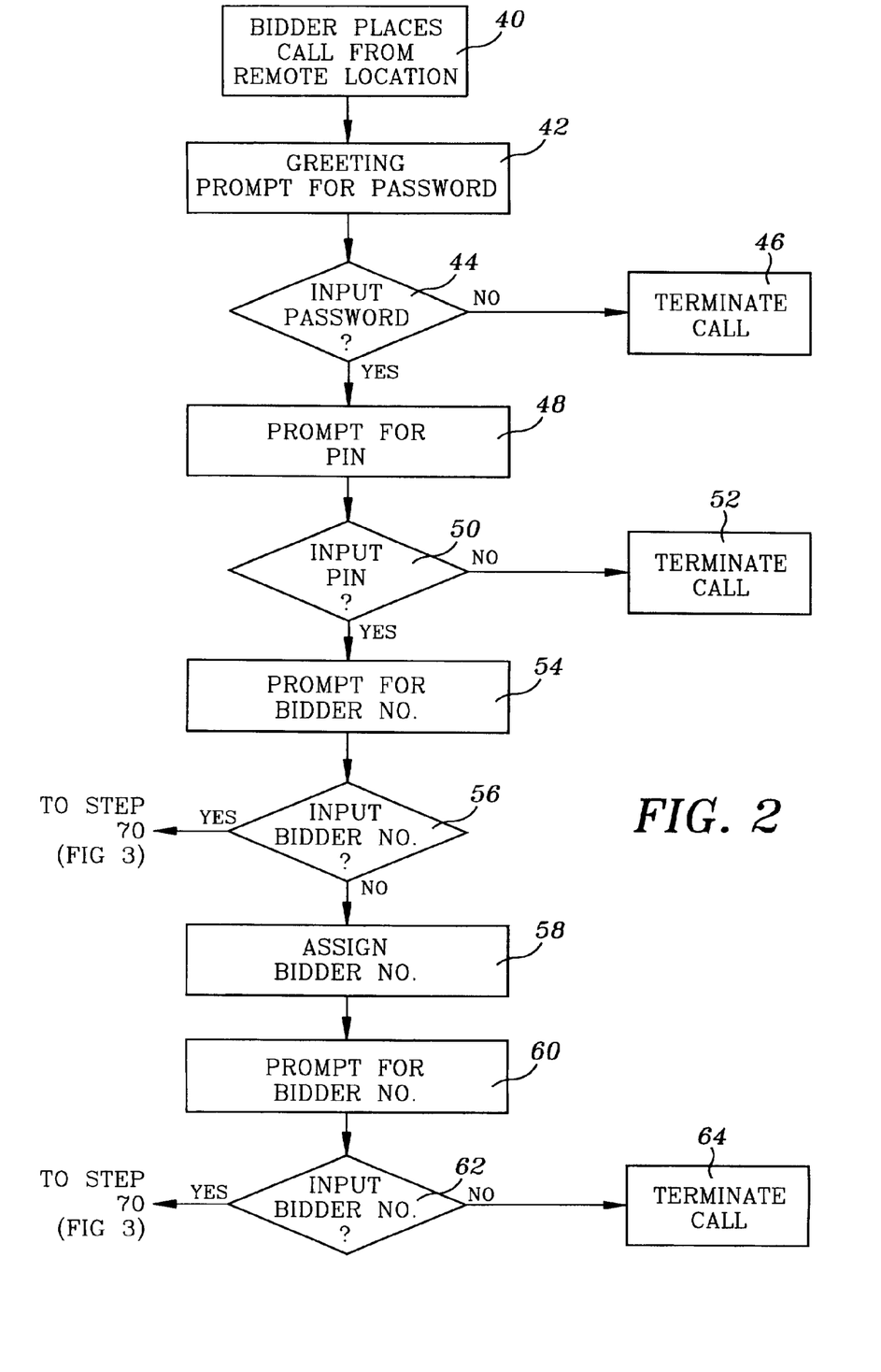
FIGS. 2–4 are flow charts illustrating the overall process of the present invention.

Referring now to FIG. 2, prior to commencement of the auction, communications paths are established between each remote location 12 and the auction site 14 via network 16. For example, a bidder at remote location 12a places a telephone call to the auction site 14 using a telephone input device 18. A bidder may call a 1-800 telephone number to auction site 14 at step 40, thereby establishing a communications path via link 22a, network 16, and link 28 to receiver/transmitter processor 26. Acknowledgment of the call to the participant at location 12a is made by processor 26 by generating a greeting to the participant and a prompt for the participant's password at step 42. Upon hearing the prompt, the participant inputs a password utilizing input device 18. A decision is made at step 44 by processor 26 to determine whether the password has been correctly input by the participant. If no password has been input, the telephone call is terminated by processor 26 at step 46. If the proper password has been input and received by processor 26, processor 26 prompts the participant at remote site 12a for a personal identification number (PIN) at step 48. The participant then enters the participant's PIN number through input device 18. Processor 26 then determines at step 50 whether a proper PIN number has been received. If no proper PIN number has been received, the telephone call is terminated at step 52. If the PIN number has been received, processor 26 prompts the participant for the participant's bidder number at step 54. Processor 26 then determines whether a proper bidder number has been input by a participant at step 56. If the bidder number has been entered and accepted, the process continues to step 70 (FIG. 3).

If processor 26 determines that no correct bidder number was input from a participant at remote location 12a, processor 26 assigns a bidder number to the participant at step 58. Processor 26 then prompts the participant for a bidder number at step 60. The participant then inputs the newly assigned bidder number and processor 26 determines if the bidder number has been input at step 62. If no bidder number has been input, the telephone call is terminated at step 64. If an acceptable bidder number has been input at step 62, the process continues at step 70 (FIG. 3).

At this point, prior to commencement of the auction, each participant at remote locations 12 are linked via network 16 to auction site 14. Processor 26 continuously monitors each input device 18 at remote locations 12 as well as transmits data to each remote location 12 over the established communication links. Prior to commencement of the auction, data such as, for example, sales information, auction messages and instructions, and music may be transmitted to each remote location 12.

Figure 3:
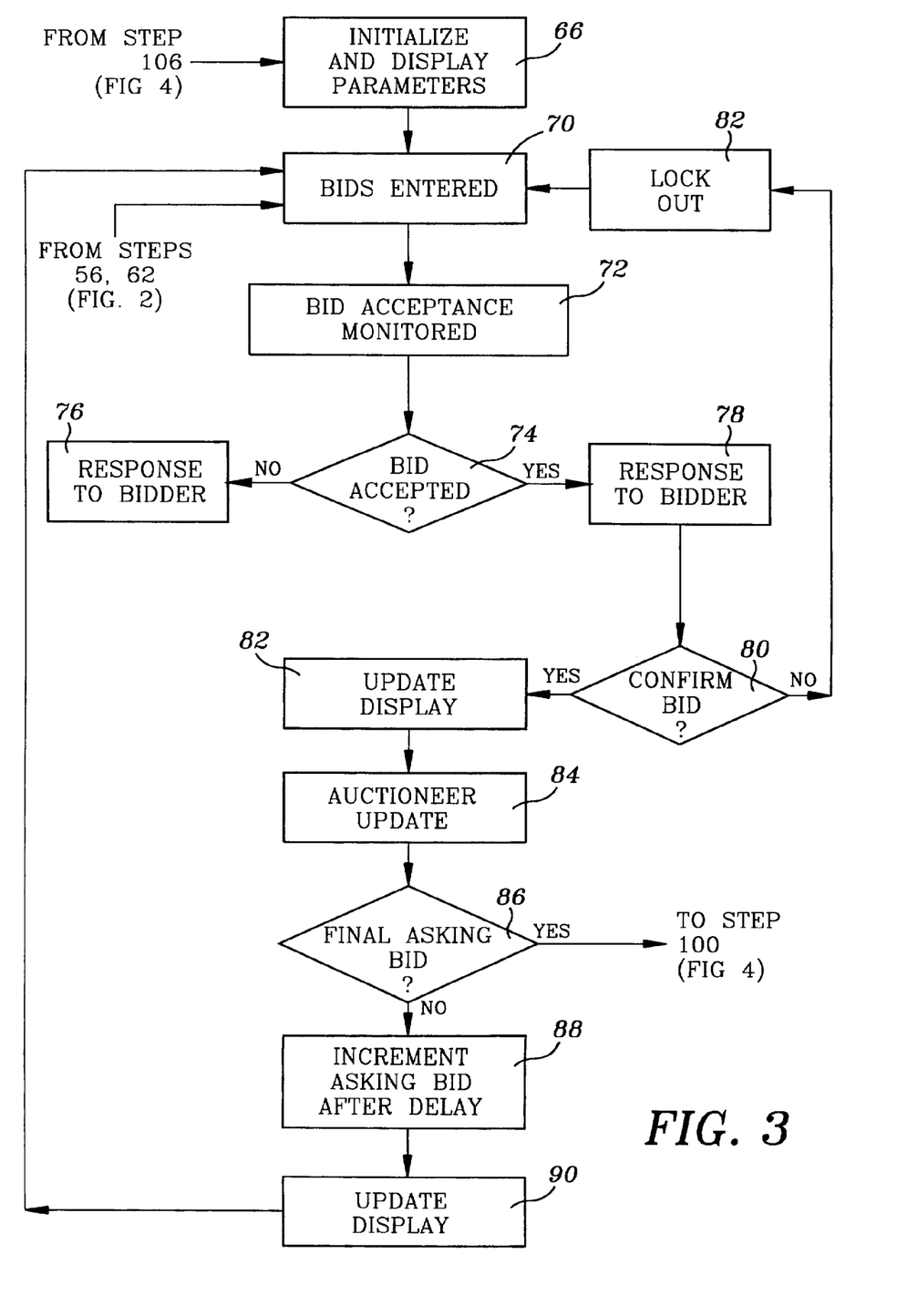

Referring now to FIG. 3, prior to commencement of an auction, various parameters are initialized and displayed at auction site 14 at step 66. Auctioneer 24 via terminal 30 inputs to processor 26 data relating to a lot number, the initial asking bid, a predefined increment, and foreign currency conversion factors for currency denominations for the remote locations participating in the auction. This information is utilized by processor 26 to generate data for display 32. Display 32 in turn provides data to broadcaster system 34 which communicates the information on display 32 via communications link 36, network 16, and communications link 22 to displays 20 at remote locations 12. Therefore, prior to commencement of the auction of each lot, each participant possesses information relating to the lot number, asking bid and its equivalent in any foreign currencies involved in the auction. Throughout the auction, display 32 is updated to reflect actual bids made during the auction (and may further include the amount required to displace the last bid) such that each participant at a remote location 12 participates in real-time at the auction and has current bidding information. The effect of the "real-time" display and participation is that while some minimal communication/calculation delays may be present, participants will be able to effectively interact with and see current information on the auction process as if the participants were actually present at auction site 14.

An additional parameter that is initialized is the duration or cycle time during which bids are accepted. This parameter may also be adjusted by auctioneer 24 during the auction.

After initialization of the system, processor 26 begins accepting bids at step 70 from the participants at remote locations 12. Participants at locations 12 utilizing input device 18 generate bid acceptance signals by utilizing input devices 18 such as, for example, by pressing the "#" symbol key on a keypad of a telephone input device 18. Those participants not wishing to enter a bid, do not touch any key on the telephone. Where processor 26 includes voice recognition capabilities, a participant may indicate acceptance of a bid by speaking into input device 18 such as "yip". Processor 26 continuously monitors communications link 28 for input bids at step 72.

Processor 26 determines at step 74 whether a bid has been accepted. If a participant's bid has not been accepted, a response is generated to each participant whose bid has not been accepted at step 76. The response may include a predetermined tone generated by transmitter 26 such as, for example, a "honk" sound or the words "Bid not taken, please bid again" communicated to a participant through device 18. If a bid has been accepted, a response is generated to the participant at step 78 such as, for example, by generating a tone at transmitter 26 in the form of a "beep" sound or the words "Bid taken" indicating to the particular participant at a remote location 12 that the bid has been accepted. At step 80, a decision is made to determine whether the particular participant at remote location 12 has indeed made the bid. The response to the bidder at step 78 includes a prompt to confirm whether the participant made the bid. The participant may actuate a key on a telephone key pad at input device 18 to confirm the bid, if the bid is not confirmed, a subsequent prompt may be generated to the participant, the participant may be routed to a help desk number, but after a predetermined time, if no confirmation is received, the participant may be locked out of participating in the next bid cycle at step 82. Alternatively, in some embodiments, step 80 may be bypassed to increase the pace on the assumption that the already screened participants are sincere. in this event only the winning bid is confined as in step 102 below.

Assuming that confirmation has been received (or alternatively bypassed) from the particular participant that a bid has been made, display 32 is updated at step 82. Display 32 generates the current bid, the location of the bidder, and bidder identification. Auctioneer 24 is also provided with bid acceptance information at step 84. At this point in the bidding process of the auction, each participant receives real-time information acknowledging bid receipt and the present status of the auction. All participants in the auction know the location of the bidder, the amount of the accepted bid in the participant's currency value, and the bidder identification number of the accepted bid.

Figure 4:
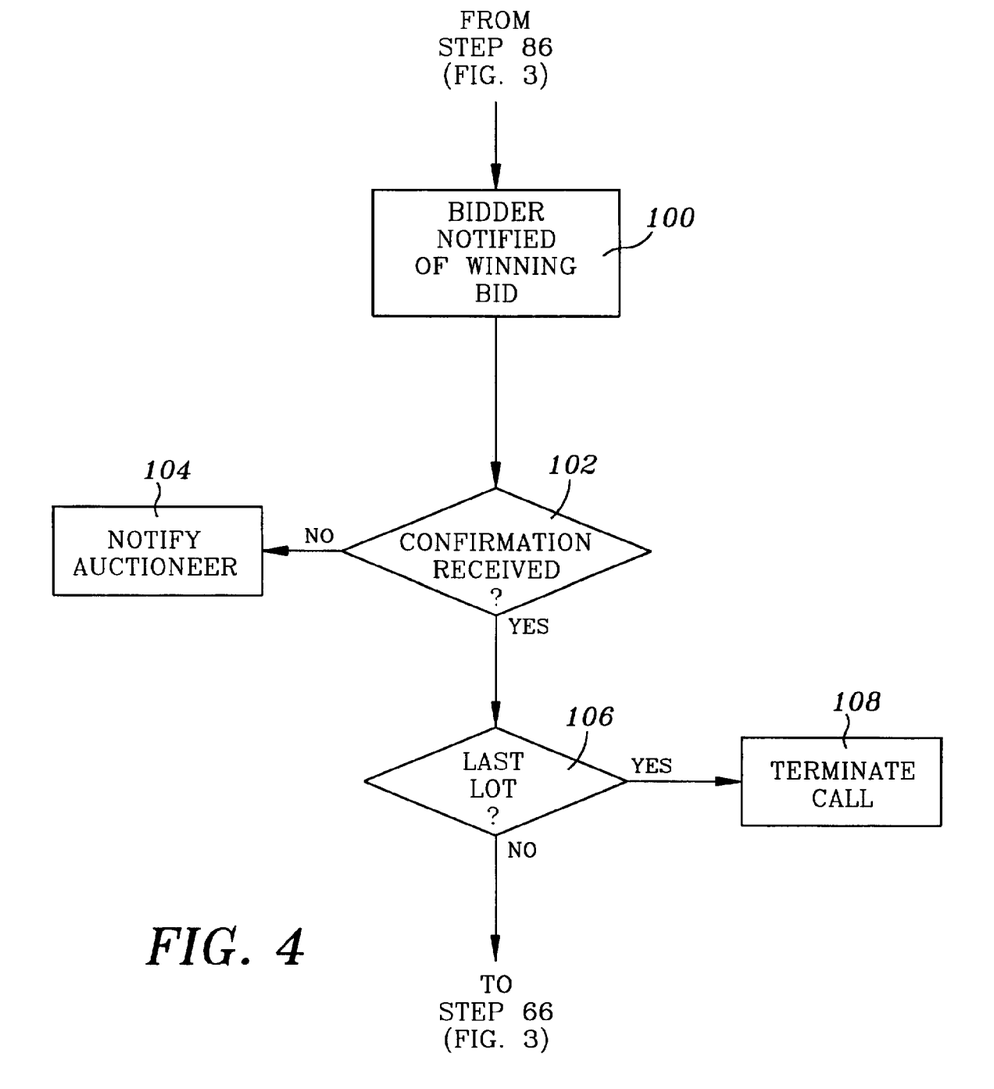

A decision is then made by auctioneer 24 at step 86 as to whether the accepted bid was the final asking bid for the lot. If the decision is yes, the process continues to step 100 (FIG. 4). If the bid is not the final asking bid at step 86, the asking bid is incremented in accordance with the predetermined increments established at initialization at step 66. The asking bid is then incremented and display 32 is updated at step 90.

Additionally, the new asking bid can be adjusted in real-time by auctioneer 24 as the bidding approaches the final bid. The new asking bid is subsequently communicated to participants via broadcaster system 34. The asking bid is incremented and a predetermined delay is incorporated into processor 26 before processor 26 begins accepting subsequent bids from participants at locations 12. In this manner, processor 26 controls subsequent bid acceptances to prevent overrunning of system 10 and establishes a bidding acceptance window of time. The delay is adjustable by auctioneer 24 based upon the particular bidding environment and aggressiveness of participants. After display 32 has been updated with current bidding information, the predetermined delay elapsed, new bids are then accepted at step 70. The process continues as asking bids are incremented and accepted until the auctioneer determines that the final asking bid has been accepted at step 86, and the process continues to step 100 (FIG. 4).

Auctioneer 24 may provide a warning that the current bid is about to be accepted as the winning bid. The warning may be communicated through audio feedback (such as a drumroll) or video feedback (such as a flashing bid amount or change in color of bid amount) in display 32. Acceptance of the final bid by auctioneer 24 may also generate a real-time response in the display 32 such as a cymbal-crash or visual acceptance signal with the accepted bid amount. With the acceptance of the final bid, the auctioneer blocks or locks out all participants but the winning bidder and proceeds to the confirmation process with the winning bidder.

Referring now to FIG. 4, with the acceptance of the final asking bid the last bidder is notified that the final bid is a winning bid at step 100. Processor 26 notifies the winning bidder and prompts the winning bidder to determine a confirmation at step 102. If confirmation is not received, a notice is provided to auctioneer 24 at step 104. Auctioneer 24 will then provide subsequent instructions to terminal 30 for communication to the winning bidder participant. If confirmation is received at step 102, a decision is made at step 106 to determine if the previous lot was the last lot in the auction. If the decision is yes, the call communication path between remote locations 12 and auction site 14 is terminated at step 108. The auctioneer may also chose to reopen bidding to the entire audience at the level of the previous bid. If subsequent lots are to be auctioned, the process continues to step 66 (FIG. 3) and new parameters are initialized and displayed for a subsequent lot to be auctioned.

During the bidding process, processor 26 maintains an audit trail of each participants' response, whether the bid is accepted or not.

It therefore can be seen that the present remote auction bidding system allows participants at remote locations from the auction site to participate in an interactive manner in an auction. Participants view a real-time video broadcast, via video conference, broadcast television, satellite, cable or Internet transmission and communicate bids utilizing an input device such as, for example, a traditional telephone. The auction is capable of incorporating and receiving bids from remote participants having multi-cultures, language, and currencies. Although more sophisticated communication devices including, for example, two way pagers, voice recognition systems, and the Internet may be utilized with the present invention, typical telephone devices provide for a simple, low cost, communication vehicle for participating in an auction conducted utilizing the present system. The communications network merely requires a telephone infrastructure which can be based upon, for example, typical long distance telephone lines, cellular systems, and satellite communication systems. The present system is scalable to accommodate unlimited numbers of participants based upon the size of the communications processor utilized at the auction site. Additionally, communications via network 16 may be secured utilizing encryption of data between the auction site and remote locations.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A method for conducting an auction to produce a winning bidder who receives the subject of the auction in exchange for the winning bid, the auction having bidders located remote from the auction site, where bidders have data input devices for communicating over a network to the auction site, comprising:

generating at the auction site an asking bid;

displaying at the auction site in real-time, the asking bid;

broadcasting in real-time over the network the asking bid to bidders remote from the auction site;

generating bid acceptance signals representing a desire to acquire the subject of the auction at a current bid by the bidders using the data input devices communicating over the network to the auction site;

delaying a variable controlled time window before accepting a first of a plurality of bid acceptance signals at the auction site;

monitoring the network for bid acceptance signals;

accepting a first bid acceptance signal after the variable controlled time window;

identifying at the auction site the bidder whose bid acceptance signal was accepted as the current bidder;

changing the asking bid to the current bid;

adjusting the variable controlled time window before accepting subsequent bid acceptance signals to a second variable controlled time window;

generating at the auction site a second asking bid;

displaying at the auction site in real-time, a second asking bid and the current bid;

broadcasting in real-time over the network the second asking bid and the current bid to bidders remote from the auction site;

delaying the second variable controlled time window before accepting subsequent bid acceptance signals;

monitoring the network for bid acceptance signals;

accepting a first bid acceptance signal after the second variable controlled time window;

identifying at the auction site the bidder whose bid acceptance signal was accepted as the new current bidder; and changing the second asking bid to the new current bid.

2. The method of claim 1 further comprising:

repeating a cycle of generating, displaying, broadcasting, generating, delaying, monitoring, accepting, identifying, and changing, at least one additional cycle, each cycle starting with a new asking bid and ending with a new current bid which was the previous new asking bid and a new current bidder;

terminating the acceptance of bid acceptance signals before a new bid acceptance signal is communicated over the network to the auction site;

identifying the most recent current bid as the winning bid;

identifying the most recent current bidder as the winning bidder; and closing the auction.

3. The method of claim 2 further comprising adjusting the variable controlled time window before accepting bid acceptance signals to a modified variable controlled time window, wherein the adjusting occurs after one time window and prior to the next time window during the auction.

4. The method of claim 3 wherein for at least one cycle during the auction after one time window and prior to the next time window, the time window before accepting bid acceptance signals remains the same.

5. The method of claim 1 wherein generating a second asking bid comprises generating a second asking bid by incrementing the current bid by a predetermined amount.

6. The method of claim 5 further comprising:

repeating a cycle of generating, displaying, broadcasting, generating, delaying, monitoring, accepting, identifying, and changing each time starting with a new asking bid and ending with a new current bid which was the previous new asking bid and a new current bidder at least one additional cycle;

generating an asking bid by incrementing the most recent current bid by a predetermined amount;

displaying at the auction site in real-time, the most recent generated asking bid and the most recent current bid;

broadcasting in real-time over the network the most recently generated asking bid and the most recent current bid to bidders remote from the auction site;

delaying the most recent variable controlled time window before accepting bid acceptance signals;

monitoring the network for bid acceptance signals;

terminating the acceptance of bid acceptance signals before a new bid acceptance signal is communicated over the network to the auction site;

identifying the most recent current bid as the winning bid;

identifying the most recent current bidder as the winning bidder; and closing the auction.

7. The method of claim 6 further comprising adjusting the predetermined amount to increment the most recent current bid to a modified predetermined amount to increment the most recent current bid, wherein the adjusting occurs after one generation of an asking bid and prior to the next generation of an asking bid during the auction.

8. The method of claim 7 wherein for at least one cycle during the auction after one generation of an asking bid and prior to the next generation of an asking bid the predetermined amount to increment the most recent current bid remains the same.

9. The method of claim 1 wherein generating of asking bids comprises generating asking bids in a plurality of currency valuations.

10. The method of claim 1 wherein the data input devices comprise telephones and monitoring the network includes sensing dual tone multi-frequency signals generated by the data input devices.

11. The method of claim 1 wherein broadcasting comprises broadcasting via television network.

12. The method of claim 11 wherein broadcasting via the television network comprises broadcasting via a satellite.

13. The method of claim 11 wherein broadcasting via the television network comprises broadcasting via a cable network.

14. The method of claim 11 wherein broadcasting via the television network comprises broadcasting via conventional television broadcasting.

15. The method of claim 1 wherein the network comprises:
  a telephone network selected from the group consisting of a conventional telephone network, cellular network, satellite communications system, and the internet; and
  a video network selected from the group consisting of a satellite communications system, cable broadcast system, conventional television broadcast system, and the internet.

16. The method of claim 1 wherein the communication over the network comprises communication of data over the internet.

17. The method of claim 1 wherein displaying and broadcasting further comprise displaying and broadcasting information regarding the most recent current bidder.

18. The method of claim 17 wherein information regarding the most recent current bidder further comprises identifying the location of the most recent current bidder.

19. The method of claim 17 wherein information regarding the most recent current bidder comprises identification of the most recent current bidder.

20. A method for conducting an auction to produce a winning bidder who receives the subject of the auction in exchange for the winning bid, the auction having bidders located remote from the auction site, where bidders have data input devices for communicating over a first network to the auction site and wherein information from the auction site is broadcast to the remote bidders over a second network, comprising:
  generating at the auction site an asking bid;
  displaying at the auction site in real-time, the asking bid;
  broadcasting in real-time over the second network the asking bid to bidders remote from the auction site;
  generating bid acceptance signals representing a desire to acquire the subject of the auction at a current bid by the bidders using the data input devices communicating over the first network to the auction site;
  beginning a bid acceptance time window in which to accept bid acceptance signals after delaying a variable controlled amount of time following broadcasting the asking bid;
  monitoring the first network for bid acceptance signals;
  accepting a first bid acceptance signal after the bid acceptance time window begins;
  terminating the bid acceptance time window after receiving the first bid acceptance signal and prior to receiving any subsequent bid acceptance signals;
  identifying at the auction site the bidder whose bid acceptance signal was accepted as the current bid;
  generating a response communicating confirmation of bid acceptance and communicating the response over the first network to the bidder having the current bid;
  generating a response communicating bid not accepted and communicating the response over the first network to each bidder who communicates a bid acceptance received after the bid acceptance time window terminated;
  changing the asking bid to the current bid;
  adjusting the bid acceptance time window before accepting subsequent bid acceptance signals to a modified bid acceptance time window by modifying the variable controlled amount of time delay after broadcasting the asking bid and before beginning the bid acceptance time window;
  generating at the auction site a new asking bid;
  displaying at the auction site in real-time, the new asking bid and the current bid;
  broadcasting in real-time over the second network the new asking bid and the current bid to bidders remote from the auction site;
  beginning the modified bid acceptance time window after delaying the modified variable controlled amount of time after broadcasting the new asking bid;
  monitoring the first network for bid acceptance signals generated by the data input devices communicated over the first network to the auction site;
  accepting the first bid acceptance signal after the modified bid acceptance time window begins;
  terminating the modified bid acceptance time window after receiving the first bid acceptance signal and prior to receiving any subsequent bid acceptance signals;
  identifying at the auction site the bidder whose bid acceptance was accepted as the current bid;
  generating a response communicating confirmation of bid acceptance over the first network to the current bidder;
  generating a response communicating bid not accepted and communicating the response over the first network to each bidder who communicates a bid acceptance received after termination of the bid acceptance time window;
  identifying the bidder whose bid acceptance was accepted as the new current bid; and
  changing the new asking bid to the new current bid.

21. The method of claim 20 further comprising:
  repeating a cycle of generating, displaying, broadcasting, generating, beginning, monitoring, accepting, terminating, identifying, generating, generating, and changing each cycle starting with a new asking bid and ending with a new current bid which was the previous new asking bid and a new current bidder at least one additional cycle;
  terminating the modified bid acceptance time window before a new bid acceptance signal is communicated over the first network to the auction site;
  identifying the most recent current bid as the winning bid;
  identifying the most recent current bidder as the winning bidder; and
  closing the auction.

22. The method of claim 21 further comprising adjusting the bid acceptance time window before accepting subsequent bid acceptance signals to a modified bid acceptance time window by modifying the variable controlled amount of time to delay after broadcasting the asking bid and before opening the bid acceptance time window, wherein the adjusting occurs after one time window and prior to the next time window during the auction.

23. The method of claim 22 wherein for at least one cycle during the auction after one time window and prior to the next time window the variable controlled amount of time to delay after broadcasting the asking bid and before opening the bid acceptance time window remains the same.

24. The method of claim 21 wherein between terminating the modified bid acceptance time window before a new bid acceptance signal is communicated over the first network to the auction site, and closing the auction the method further comprises:
  generating a prompt to the winning bidder over the first network seeking confirmation of the winning bid; and receiving confirmation from the winning bidder over the first network.

25. The method of claim 20 wherein generating a new asking bid comprises generating a new asking bid by incrementing the current bid by a predetermined amount.

26. The method of claim 25 further comprising:
repeating a cycle of generating, displaying, broadcasting, generating, beginning, monitoring, accepting, terminating, identifying, generating, generating, changing each cycle starting with a new asking bid and ending with a new current bid which was the previous new asking bid and a new current bidder at least one additiona cycle;
generating an asking bid by incrementing the most recent current bid by a predetermined amount;
displaying at the auction site in real-time, the most recent generated asking bid and the most recent current bid;
broadcasting in real-time over the second network the most recently generated asking bid and the most recent current bid to bidders remote from the auction site;
beginning a bid acceptance time window in which to accept bid acceptance signals after delaying the most recent variable controlled amount of time following broadcasting the asking bid;
monitoring the first network for bid acceptance signals generated by the data input devices communicated over the first network to the auction site;
terminating the acceptance of bid acceptance signals before a new big acceptance signal is communicated over the first network to the auction site;
identifying the most recent current bid as the winning bid;
identifying the most recent current bidder as the winning bidder; and closing the auction.

27. The method of claim 26 further comprising adjusting the predetermined amount to increment the most recent current bid to a modified predetermined amount to increment the most recent current bid, wherein the adjusting occurs after one generation of an asking bid and prior to the next generation of an asking bid during auction.

28. The method of claim 27 wherein for at least one cycle during the auction after one generation an asking bid and prior to the next generation of an asking bid the predetermined amount to increment the most recent current bid remains the same.

29. The method of claim 26 wherein between terminating the modified bid acceptance time window before a new bid acceptance signal is communicated over the first network to the auction site, and closing the auction the method further comprises:
generating a prompt to the winning bidder over the first network seeking confirmation of the winning bid; and
receiving confirmation from the winning bidder generated by the data input devices communicated over the first network.

30. The method of claim 20 wherein the first network and the second network collectively comprise a combination of types of communications systems for communicating between bidders remote from the auction site and the auction site.

31. The method of claim 20 wherein the first network comprises:
a telephone network selected from the group consisting of conventional telephone network, cellular network, satellite communications system, and the internet.

32. The method of claim 20 wherein the second network comprises:
a video network selected from the group consisting of satellite communications system, cable broadcast system, conventional television broadcast system, and the internet.

33. A method for conducting an auction to produce a winning bidder who receives the subject of the auction in exchange for the winning bid, the auction having bidders located remote from the auction site, where bidders have data input devices for communicating over a network to the auction site, comprising:
generating at the auction site an asking bid;
displaying at the auction site in real-time the asking bid;
broadcasting in real-time over the network the asking bid to bidders remote from the auction site;
generating bid acceptance signals representing a desire to acquire the subject of the auction at a current bid by the bidders using the data input devices communicating over the network to the auction site;
introducing a fixed programmed delay time period before accepting a first of a plurality of bid acceptance signals at the auction site;
monitoring the network for bid acceptance signals;
accepting a first bid acceptance signal after the programmed delay time period;
identifying at the auction site the bidder whose bid acceptance signal was accepted as the current bidder;
changing the asking bid to the current bid;
generating at the auction site a second asking bid;
displaying at the auction site in real-time, a second asking bid and the current bid;
broadcasting in real-time over the network the second asking bid and the current bid to bidders remote from the auction site;
introducing a programmed delay time period before accepting a second of a plurality of bid acceptance signals at the auction site;
monitoring the network for bid acceptance signals;
accepting a first bid acceptance signal after the programmed delay time period;
identifying at the auction site the bidder whose bid acceptance signal was accepted as the new current bidder; and
changing the second asking bid to the new current bid.

34. The method of claim 33 further comprising:
repeating a cycle of generating, displaying, broadcasting, generating, introducing, monitoring, accepting, identifying, and changing, at least one additional cycle, each cycle starting with a new asking bid and ending with a new current bid which was the previous new asking bid and a new current bidder;
terminating the acceptance of bid acceptance signals before a new bid acceptance signal is communicated over the network to the auction site;
identifying the most recent current bid as the winning bid;
identifying the most recent current bidder as the winning bidder; and
closing the auction.

35. The method of claim 34 further comprising adjusting the programmed delay time period before accepting bid acceptance signals to a modified programmed delay time period, wherein the adjusting occurs after one delay time period and prior to the next delay time period during the auction.

36. The method of claim 35 wherein for at least one cycle during the auction after one delay time period and prior to the next delay time period, the programmed amount of time for delay before accepting bid acceptance signals remains the same.

37. The method of claim 33 wherein generating a second asking bid comprises generating a second asking bid by incrementing the current bid by a predetermined amount.

38. The method of claim 37 further comprising:

repeating a cycle of generating, displaying, broadcasting, generating, introducing, monitoring, accepting, identifying, and changing each time starting with a new asking bid and ending with a new current bid which was the previous new asking bid and a new current bidder at least one additional cycle;

generating an asking bid by incrementing the most recent current bid by a predetermined amount;

displaying at the auction site in real-time, the most recent generated asking bid and the most recent current bid;

broadcasting in real-time over the network the most recently generated asking bid and the most recent current bid to bidders remote from the auction site;

delaying the most recent programmed delay time period before accepting bid acceptance signals;

monitoring the network for bid acceptance signals;

terminating the acceptance of bid acceptance signals before a new bid acceptance signal is communicated over the network to the auction site;

identifying the most recent current bid as the winning bid;

identifying the most recent current bidder as the winning bidder; and closing the auction.

39. The method of claim 38 further comprising adjusting the predetermined amount to increment the most recent current bid to a modified predetermined amount to increment the most recent current bid, wherein the adjusting occurs after one generation of an asking bid and prior to the next generation of an asking bid during the auction.

40. The method of claim 39 wherein for at least one cycle during the auction after one generation of an asking bid and prior to the next generation of an asking bid the predetermined amount to increment the most recent current bid remains the same.

41. The method of claim 33 wherein generating of asking bids comprises generating asking bids in a plurality of currency valuations.

42. The method of claim 33 wherein the data input devices comprise telephones and monitoring the network includes sensing dual tone multi-frequency signals generated by the data input devices.

43. The method of claim 33 wherein broadcasting comprises broadcasting via television network.

44. The method of claim 43 wherein broadcasting via the television network comprises broadcasting via a satellite.

45. The method of claim 43 wherein broadcasting via the television network comprises broadcasting via a cable network.

46. The method of claim 43 wherein broadcasting via the television network comprises broadcasting via conventional television broadcasting.

47. The method of claim 33 wherein the network comprises:

a telephone network selected from the group consisting of a conventional telephone network, cellular network, satellite communications system, and the internet; and a video network selected from the group consisting of a satellite communications system, cable broadcast system, conventional broadcast system, and the internet.

48. The method of claim 33 wherein the communication over the network comprises communication of data over the internet.

49. The method of claim 33 wherein displaying and broadcasting further comprise displaying and broadcasting information regarding the most recent current bidder.

50. The method of claim 49 wherein information regarding the most recent current bidder further comprises identifying the location of the most recent current bidder.

51. The method of claim 49 wherein information regarding the most recent current bidder comprises identification of the most recent current bidder.

52. A method for conducting an auction to produce a winning bidder who receives the subject of the auction in exchange for the winning bid, the auction having bidders located remote from the auction site, where bidders have data input devices for communicating over a first network to the auction site and wherein information from the auction site is broadcast to the remote bidders over a second network, comprising:

generating at the auction site an asking bid;

displaying at the auction site in real-time, the asking bid;

broadcasting in real-time over the second network the asking bid to bidders remote from the auction site;

generating bid acceptance signals representing a desire to acquire the subject of the auction at a current bid by the bidders using the data input devices communicating over the first network to the auction site;

beginning a bid acceptance time window in which to accept bid acceptance signals after delaying a controlled amount of time following broadcasting the asking bid;

monitoring the first network for bid acceptance signals;

accepting a first bid acceptance signal after the bid acceptance time window begins;

terminating the bid acceptance time window after receiving the first bid acceptance signal and prior to receiving any subsequent bid acceptance signals;

identifying at the auction site the bidder whose bid acceptance signal was accepted as the current bid;

generating a response communicating confirmation of bid acceptance and communicating the response over the first network to the bidder having the current bid;

generating a response communicating bid not accepted and communicating the response over the first network to each bidder who communicates a bid acceptance received after the bid acceptance time window terminated;

changing the asking bid to the current bid;

repeating at least one additional cycle of generating, displaying, broadcasting, generating, beginning, monitoring, accepting, terminating, identifying, generating, generating, and changing, wherein each cycle starts with a new asking bid and ends with a new current bid which was the preceding new asking bid.

53. The method of claim 52 wherein the controlled amount of time to delay following broadcasting the asking bid and before opening the bid acceptance window is a variable controlled amount of time.

* * * * *